United States Patent
Mignano et al.

(10) Patent No.: US 8,256,320 B2
(45) Date of Patent: Sep. 4, 2012

(54) DEVICE FOR HANDLING AND/OR PERFORMING WORK OPERATIONS ON OBJECTS

(75) Inventors: Paolo Mignano, Correggio (IT); Claudio Bianchini, Reggio Emilia (IT)

(73) Assignee: Motor Power Company S.R.L., Castelnovo Sotto (IT)

( * ) Notice: Subject to any disclaimer, the term of this patent is extended or adjusted under 35 U.S.C. 154(b) by 201 days.

(21) Appl. No.: 12/739,517

(22) PCT Filed: Nov. 26, 2007

(86) PCT No.: PCT/IT2007/000822
§ 371 (c)(1), (2), (4) Date: Apr. 23, 2010

(87) PCT Pub. No.: WO2009/069155
PCT Pub. Date: Jun. 4, 2009

(65) Prior Publication Data
US 2010/0242661 A1    Sep. 30, 2010

(51) Int. Cl.
*B25J 18/04* (2006.01)

(52) U.S. Cl. ......... 74/490.03; 74/490.1; 901/18; 901/23

(58) Field of Classification Search ............... 74/490.01, 74/490.03, 490.07, 490.08, 490.1; 901/18, 901/23
See application file for complete search history.

(56) References Cited

U.S. PATENT DOCUMENTS

| | | | | |
|---|---|---|---|---|
| 4,628,765 A | * | 12/1986 | Dien et al. | 74/665 A |
| 6,019,013 A | * | 2/2000 | Luik | 74/490.01 |
| 6,059,169 A | | 5/2000 | Nihei et al. | |
| 6,658,962 B1 | * | 12/2003 | Rosheim | 74/490.05 |
| 7,101,129 B2 | | 9/2006 | Gronbach | |
| 2003/0049087 A1 | | 3/2003 | Gronbach et al. | |
| 2004/0115019 A1 | | 6/2004 | Gronbach | |
| 2010/0307278 A1 | * | 12/2010 | Mignano | 74/490.03 |
| 2011/0162805 A1 | * | 7/2011 | Cheng | 156/578 |
| 2011/0192246 A1 | * | 8/2011 | Li et al. | 74/490.03 |
| 2011/0271785 A1 | * | 11/2011 | Stampfli et al. | 74/490.03 |

FOREIGN PATENT DOCUMENTS

| | | |
|---|---|---|
| DE | 10141865 A1 | 3/2003 |
| EP | 0842727 A | 5/1998 |
| EP | 1419851 A1 | 6/2004 |
| WO | 2007131686 A1 | 11/2007 |

* cited by examiner

*Primary Examiner* — Troy Chambers
*Assistant Examiner* — Terence Boes
(74) *Attorney, Agent, or Firm* — Pearne & Gordon LLP

(57) ABSTRACT

A device for handling and/or performing work operations on objects comprises: at least a first arm (2) comprising a first end (2a) for supporting a tool (3) for moving or working; means for supporting and moving (4) the first arm (2) which comprise at least a first linear electric motor (5), developing on a closed path (P), for moving the first arm (2) along a circular trajectory (91), and at least a second linear electric motor (6), to which the first arm (2) is directly connected, developing in an arched trajectory (92). The first (5) and the second (6) linear electric motors cooperate to move the first arm (2).

14 Claims, 3 Drawing Sheets

DEVICE FOR HANDLING AND/OR PERFORMING WORK OPERATIONS ON OBJECTS

TECHNICAL FIELD

The invention relates to a device for handling and/or performing work operations on objects.

In particular, the invention is applicable in the industrial sector in movement systems of small-mass objects weighing a few kilograms, and for which fast and precise movement is required.

BACKGROUND ART

The invention is applicable in systems for gathering and positioning products, known as "pick and place" systems, in lines of packaging or assembly of products, in machines for separating and/or sorting products or in object handling systems.

In the specific case, the present invention can be used in the medical field for moving and handling surgical instruments, or in the field of mechanical working for moving tools such as millers, drill bits, pliers or the like, or for the movement and training of precision instruments in general, such as for example lasers.

As is known, these systems use robot arms composed of a plurality of hinged link mechanisms, which at an end thereof bear a tool, such as pliers, a sucker or a work instrument.

In particular, in pick and place applications, the object, located on a horizontal plane or on a conveyor belt is gathered and moved, parallel to the work plane or with its orientation changed with respect to the plane, to be deposited internally of a special housing or a second conveyor belt.

Robot architectures developed in the prior art are essentially of two types: arms of the traditional type (generally anthropomorphic) or robots having parallel kinematics mechanisms.

Both of these solutions use, in general terms, traditional actuators, typically constituted by an electric motor coupled to a mechanical reducer which adapts the torque-speed characteristics to those required by the application, usually by reducing the number of revolutions and raising the torque value.

The limitations of anthropomorphic structures are essentially constituted by the fact that the actuators are distributed along the kinematic chain constituting the arm, thus involving considerable masses in movement and limiting the dynamics of the operation and consequently the working speed of the whole production line. It is worth remembering that the work speeds required are in the order of 150-200 collections per minute for each arm.

However, the traditional structures exhibit larger work volumes and in is general require control algorithms which are simpler to realise.

Parallel kinematics machines obviate the above-described dynamic limitation by concentrating all the actuators in the robot zone which remains fixed, transferring the movement to the object via a complex mechanical structure of mechanical links, often comprising more than one arm, which is however light and rigid.

Though this method gives high dynamic levels, parallel kinematics robots only enable a contained work volume to be carried out. Further, the presence in the work volume of no-go zones to be avoided during functioning in order not to cause the structure to block further reduces the useful working zone.

Lastly, the complexity of the structure considerably complicates the realisation of the control algorithms.

For both solutions there is the limitation of having to provide the actuators with mechanical reducers which apart from constituting an additional cost, complicate the maintenance operations, make the structure less rigid, increase noise and vibration in the system, reduce system reliability and complicate control processes.

The aim of the present invention is to obviate the drawbacks encountered in the solutions of the prior art.

In particular, the aim of the present invention is to realise a device for handling and/or performing work operation on objects which combine the work volumes characteristic of anthropomorphic structures with the high-level dynamics and precision of parallel kinematics machines.

In other words, an aim of the present invention is to realise a device for handling and/or the performance of work operations on objects which enables a reduction in the masses in motion, in particular in the zone closest to the object, enabling performance-giving dynamics, a decidedly large work volume and an extremely simple control structure.

Further, another aim of the present invention is to realise a device for handling and/or performing work operations on objects provided with a simplified kinematic structure, being without supplementary mechanical organs such as reducers, screw systems, systems for conversion of motion from circular to straight etc., thus leading to a reduction in costs, greater system reliability, better control of force and torque and extremely simplified control algorithms.

DISCLOSURE OF INVENTION

A description will now be made, by way of non-limiting example, of a preferred but not exclusive embodiment of a handling device for objects, illustrated in the accompanying figures of the drawings, in which.

Figure 1:
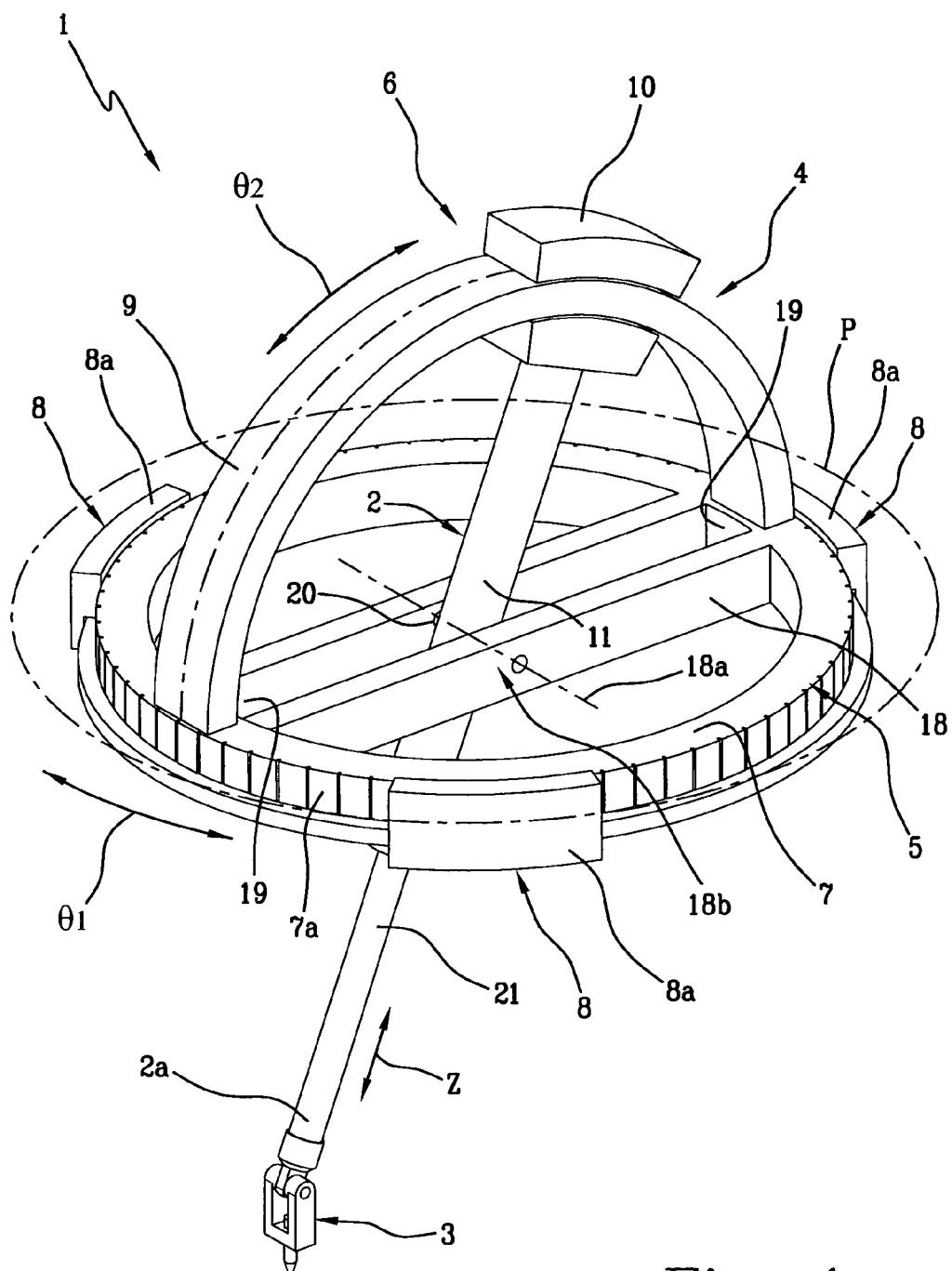
FIG. 1 is a perspective view of a device for handling and/or performing work operations on objects, according to the present invention.

With reference to the figures of the drawings, 1 denotes a device for handling and/or performing work operations on objects in accordance with the present invention.

The device 1 comprises at least a first arm 2 exhibiting a first end 2a, which first end 2a bears a tool 3.

The tool 3 is advantageously associated to the first end 2a of the arm 2 by means of a hinged connection, preferably jointed, which enables the tool 3 to make a circular and curved movement in all direction in a space defined about the first end 2a of the arm 2.

The tool 3 can advantageously be a gripping instrument, such as pliers or a sucker, or a work tool, such as a drill, a miller, a laser or any other type of mechanical or precision instrument, according to needs.

The device 1 further comprises means for supporting and moving 4 the first arm 2, which support the first arm 2 and move it along at least a circular trajectory $\theta 1$ and along at least an arched trajectory $\theta 2$.

The means for supporting and moving 4 comprise at least a first linear electric motor 5 for promoting rotation of the first arm 2 along the circular trajectory $\theta 1$ and at least a second linear electric motor 6 for promoting oscillation of the first arm 2 along the arched trajectory $\theta 2$.

The first linear electric motor 5 is advantageously curved and develops on a closed path P, preferably circular, while the second linear motor 6 is arched and develops on a semicircular path S.

The second linear electric motor 6 is preferably structurally associated to the first linear electric motor 5, and in particular is arranged perpendicular to the first linear electric motor 5, such as to conjoin two diametrically opposite portions 19 of the first linear motor 5.

The first arm 2 is associated to the second linear electric motor 6.

Both the first motor 5 and the second motor 6 comprise a stator and a rotor.

With particular reference to the first linear motor 5, the rotor 7 is defined by a plurality of permanent magnets 7a defining a ring, arranged along the circular path P, while the stator 8 is defined by at least a block, internally of which there is at least a coil 8a.

In a second embodiment, not illustrated, coils 8a are applied to the rotor 7 and the magnets 7a are applied on the stator 8.

The stator 8 is arranged concentrically to the rotor 7.

The rotor 7 is rotatable about the rotation axis 5a of the first linear electric motor 5, and draws in rotation both the second linear electric motor 6, fixed thereon, and the first arm 2 connected to the second linear electric motor 6.

The second linear electric motor 6 comprises a stator 9 in the form of a plurality of permanent magnets defining a path along the semicircular course S, and a moving part which is a cursor 10 containing at least a coil, arranged slidably on the arched path of the stator 9.

The semicircular path defining the stator 9 of the second linear electric motor 6 is connected perpendicularly to the first linear electric motor 5, at the two diametrically-opposite portions 19 of the ring defining the rotor 7.

The first arm 2 is associated to the cursor 10 being the moving part of the second linear electric motor 6.

In order to ensure greater stability and precision in movement, the first arm 2 is advantageously hinged to a bracket 18, diametral with respect to the ring defining the rotor or moving part 7 of the first linear electric motor 5. In particular, the bracket 18 is connected to the moving part 7 at the two portions 19, diametrically opposite, conjoining the semicircular path defining the stator 9 of the second linear electric motor 6 and the ring defining the moving part 7 of the first linear electric motor 5. The first arm is preferably hinged, by special means for connecting 20, to a median point 18b of the bracket 18, such as to perform oscillations about an axis 18a.

The first arm 2 rigidly connects the cursor 10 defining the moving part of the second linear electric motor 6 with the median point 18b of the bracket 18.

Following the running of the cursor 10 along the path of the stator 9, the first arm 2 is inclined at various angles with respect to the plane containing the first linear electric motor 6. The arm 2, during the oscillation thereof about the trajectory θ2, preferably occupies successive radial positions with respect to the semicircular course defining the stator 9 of the second linear electric motor 6.

By selectively or contemporaneously activating the two linear electric motors 5, 6, various movements of the first arm 2 can be obtained.

In a case in which only the second linear electric motor 6 is active, the first arm 2 can only perform oscillating excursions in the plane containing the second motor 6. Alternatively, in a case in which only the first linear electric motor 5 is active, the arm is exclusively subject to a rotating movement and describes more or less broad circular trajectories according to the inclination of the first arm 2 with respect to the second linear electric motor 6.

By combining the rotational movement along the circular path θ1, with the oscillating movement along the semicircular trajectory θ2, the arm 2 describes a plurality of circular trajectories which are concentric with the axis 5a of rotation of the first linear electric motor 5.

The first arm 2 can also be mobile axially along a direction Z, parallel to the longitudinal axis 2c thereof.

With particular reference to the axial movement, it is specified that the first arm 2 comprises a portion or stem 21 which is longitudinally slidable along the axis 2c, and a third linear electric motor 11, which is connected and active directly on the portion or stem 21 in order to cause axial extension thereof.

The third linear electric motor 11 is preferably telescopically associated to the slidable portion or stem 21 of the first arm 2.

Figure 3:
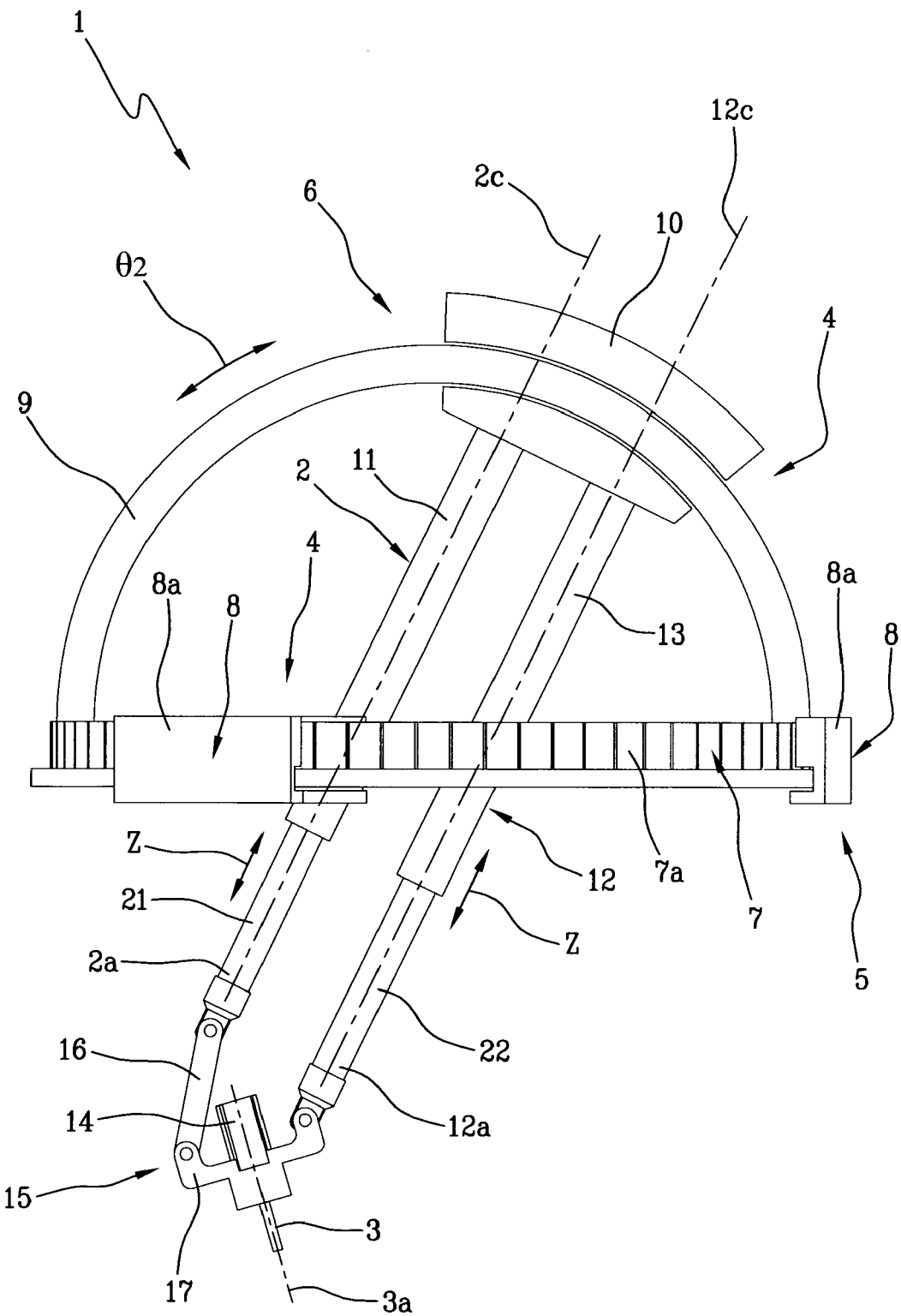
FIG. 3 is a lateral view of a variant of the device for handling and/or performing work operations on objects, in agreement with the present invention.

In an alternative configuration, illustrated in FIG. 3, the device 1 further comprises a second arm 12, entirely similar to the first arm 2 and cooperating with the first arm 2 in order to move the tool 3.

The second arm 12 too, preferably parallel to the first arm 2, is connected to the second linear electric motor 6 and oscillates, solidly with the first arm 2, along the arched semicircular trajectory θ2 contained in the plane containing the second linear electric motor 6.

Similarly, the second arm 12 is hinged to the median point 18b of the bracket 18, as already described in reference to the first arm 2.

The second arm 12 too comprises a portion or stem 22 which is longitudinally slidable along the axis 12c thereof, and a fourth linear electric motor 13, connected and active directly on the portion 22 in order to cause axial elongation thereof, along the same direction Z run by the stem 21 of the first arm 2.

The first arm 2 and the second 12, and in particular the relative stems 21, 22, are thus slidably mobile with alternated movements or same-direction movements according to the movements required by the tool 3, associated to the first end 2a, 12a of each arm 2, 12.

In this way the height of the work plane of the tool 3 can be varied.

At the respective first ends 2a, 12a, the arms 2 and 12 exhibit means for supporting and moving 15 the tool 3. In particular, the means for supporting and moving 15 the tool comprise hinged kinematics, such as for example a first 16 and a second 17 con rod, which define, with the first end 2a, 12a of each arm 2, 12, a four-bar link, in order to enable the tool 3 to move on an arc of circumference having a range of between 110° and 140°.

The range of the arc of circumference swept by the tool 3 depends on design choices, and in particular on the distance between the two arms 2, 12 and the length of the con rods 16, 17.

Figure 2:
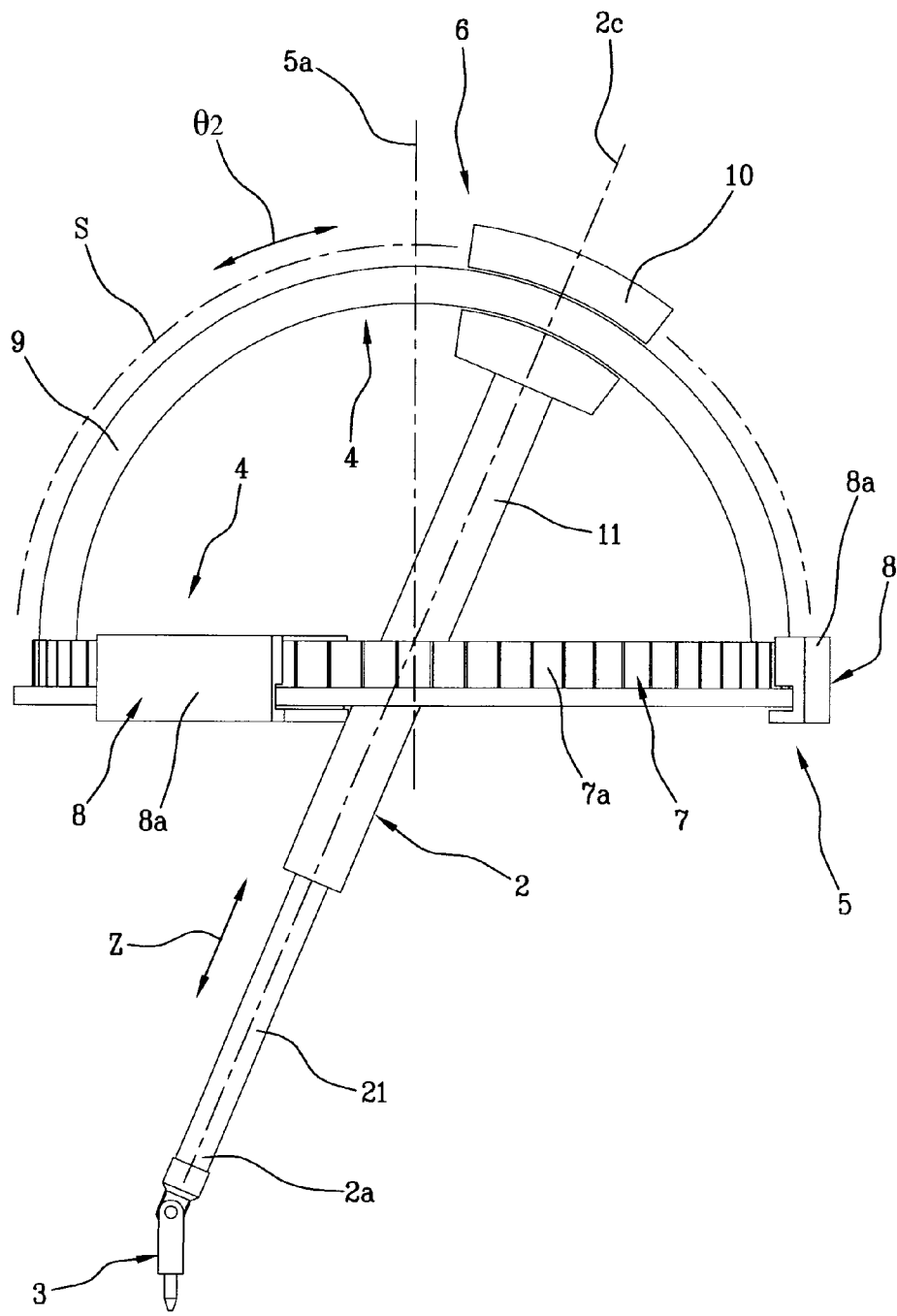
FIG. 2 is a lateral view of the device of FIG. 1.

The tool 3 is also mobile about the axis 3a thereof. In both the single-arm version, shown in FIGS. 1 and 2, and in the two-arm version, shown in FIG. 3, the movement of the tool 3 about the rotation axis 3a thereof is powered by a traditional electric motor 14, associated to the tool 3 itself.

The third 11 and the fourth 13 linear electric motors are preferably ironless electric motors.

The invention offers important advantages since it provides a structure having contained dimensions, which is able to manage work volumes which are characteristic of anthropomorphic structures, but with the high dynamics and precision typical of parallel kinematics machines. This is obtained by means of a non-conventional kinematic structure specially designed to be able to exploit direction-motion innovative actuators, which do not require the interposing of supplementary mechanical organs.

Linear electric motors directly command the element to which they are applied, avoiding the presence of kinematic connections which make the structure heavy, increase the amount of moving parts and slow down the working speed and the dynamics of the machine.

The special construction choice of the use of ironless linear electric motors leads to considerable advantages.

The magnetic field is symmetrical, there is an excellent exploitation of the magnetic flow, there are no forces of attraction and the mass of moving parts is small. A similar motor, though not offering high thrust levels, generally not above 2 kN, enables rapid and precise movements, optimal for pick and place applications or Cartesian robots.

The carbon arms help to lighten the device and the constructional simplicity of the linear motors simplifies the structural complexity which is typical of the devices of the prior art.

The presence both of straight guides and circular guides makes the whole structure extremely flexible and versatile in any type of motion and technical application required.

The absence of supplementary mechanical organs further enables a reduction of costs, a greater system reliability, a better control of torque force, as well as extremely simplified control algorithms.

The invention claimed is:

1. A device for handling and/or performing work operations on objects, comprising:
    at least a first arm (2) comprising a first end (2a) for supporting a tool (3);
    means for supporting and moving (4) the first arm (2);
    wherein the means for supporting and moving (4) comprise at least a first linear electric motor (5), developing on a closed path (P), for moving the first arm (2) along a circular trajectory (θ1), and at least a second linear electric motor (6), developing on an arched path (S), for moving the first arm (2) along a semicircular trajectory (θ2);
    the second linear electric motor (6) surmounting the first linear electric motor (5), conjoining diametrically-opposite two portions (19) of the first linear electric motor (5) to one another;
    the second linear electric motor (6) being structurally associated to the first linear electric motor (5) and being arranged perpendicular to the first linear electric motor (5).

2. The device of claim 1, wherein the first linear electric motor (5) is curved and develops along a circular path (P); the first linear electric motor (5) comprising a circular rotor (7) and a stator (8) which is concentric to the rotor (7).

3. The device of claim 1, wherein the second linear electric motor (6) is associated to the first linear electric motor (5); the first linear electric motor (5) and the second linear electric motor (6) cooperating with one another in order to move the first arm (2).

4. The device of claim 1, wherein the second linear electric motor (6) comprises a stator (9) defined by an arched guide comprising a plurality of permanent magnets, and a rotor (10) defined by a slidingly mobile cursor on the guide, and internally comprising at least an electric coil.

5. The device of claim 4, wherein the first arm (2) is associated to the mobile cursor; the cursor causing oscillation of the first arm (2) on a diameter plane of the first linear electric motor (5).

6. The device of claim 1, wherein the first arm (2) is axially mobile along a direction (Z) which is parallel to a longitudinal axis (2c) of the first arm (2).

7. The device of claim 6, wherein the first arm (2) comprises a sliding portion (21) and a third linear electric motor (11), acting directly on the sliding portion (21), to cause translation of the sliding portion (21) along the direction (Z) parallel to the longitudinal axis (2c) of the first arm (2).

8. The device of claim 1, wherein the tool (3) is connected articulatedly to the first end (2a) of the first arm (2), in order to move in a plurality of directions.

9. The device of claim 1, wherein the device comprises a second arm (12), cooperating with the first arm (2) in order to move the tool (3).

10. The device of claim 4, further comprising a second arm (12), cooperating with the first arm (2) in order to move the tool (3), and wherein the first arm (2) and the second arm (12) are parallel to one another and associated to the cursor of the second linear electric motor (6).

11. The device of claim 9, wherein the first arm (2) and the second arm (12) are slidingly mobile along a direction (Z) which is parallel to the respective longitudinal axes (2c, 12c) thereof.

12. The device of claim 9, wherein the second arm (12) comprises a sliding portion (22) and a fourth linear electric motor (13), directly acting directly on the sliding portion (22) in order to translate the sliding portion (22) in a parallel direction (Z) to a longitudinal axis (12c) of the second arm (12).

13. The device of claim 1, wherein the first arm (2) and a second arm (12) support, at respective first ends (2a, 12a) thereof, means for supporting and moving (15) the tool (3).

14. The device of claim 13, wherein the means for supporting and moving (15) are articulated.

* * * * *